C. S. SMITH.
TUBE FORMING APPARATUS.
APPLICATION FILED DEC. 26, 1916.
1,313,025.
Patented Aug. 12, 1919.
3 SHEETS—SHEET 1.
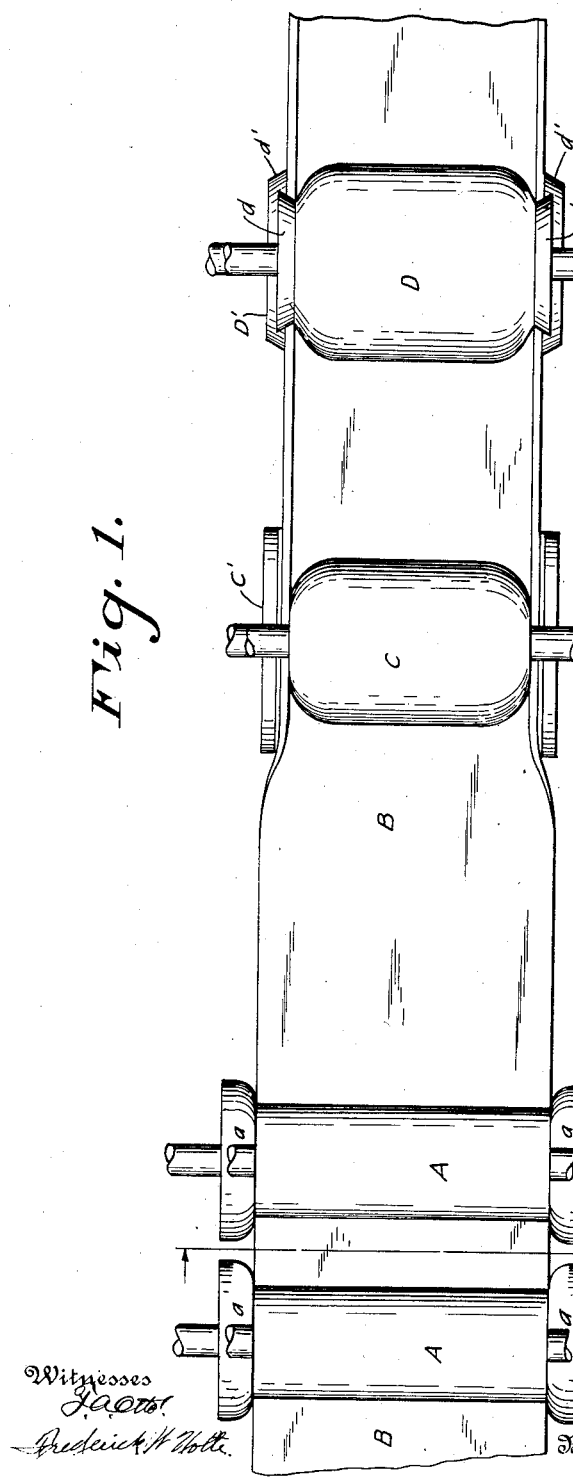
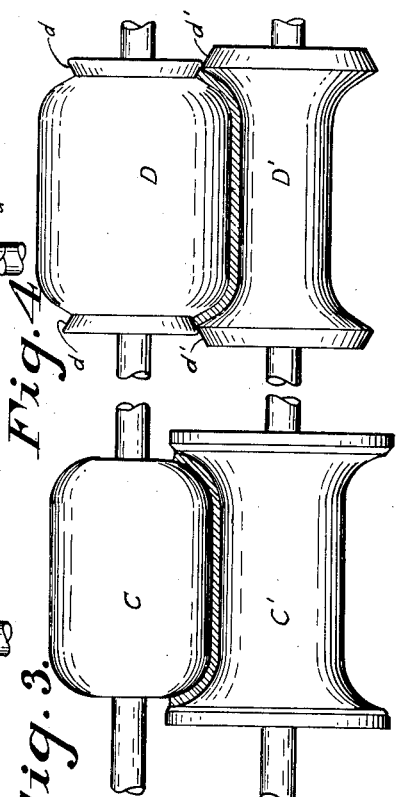
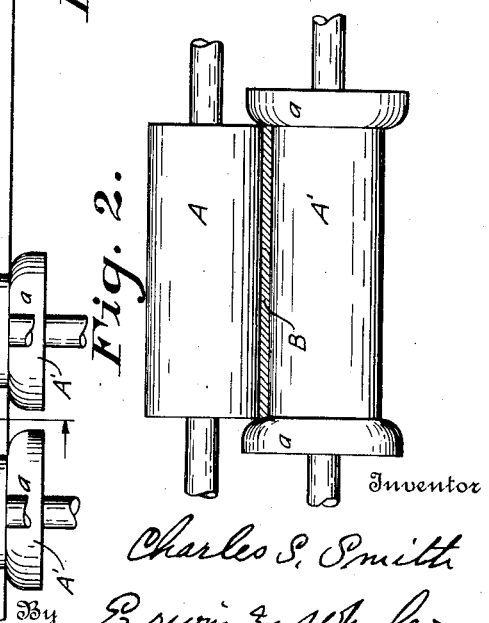

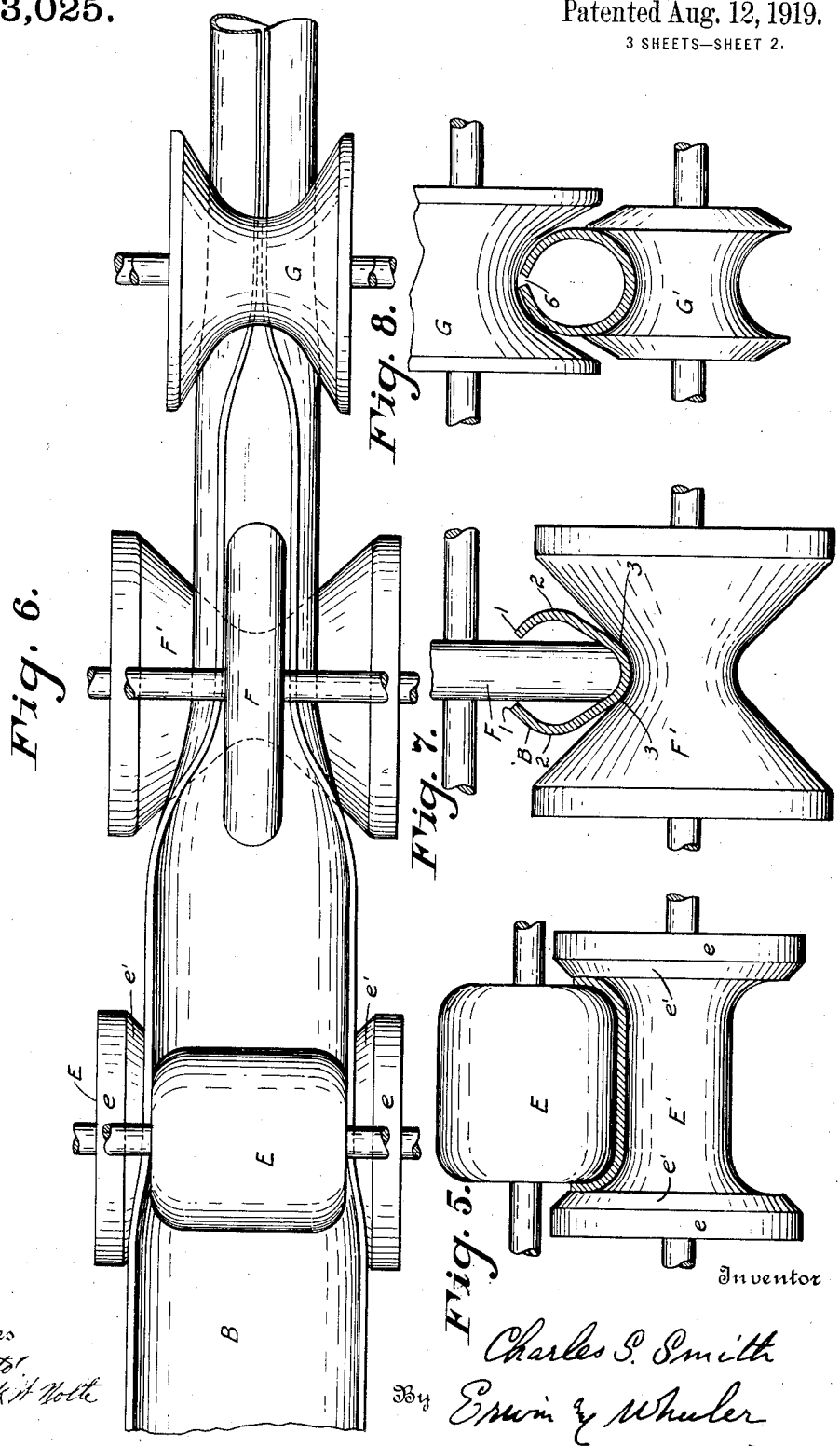

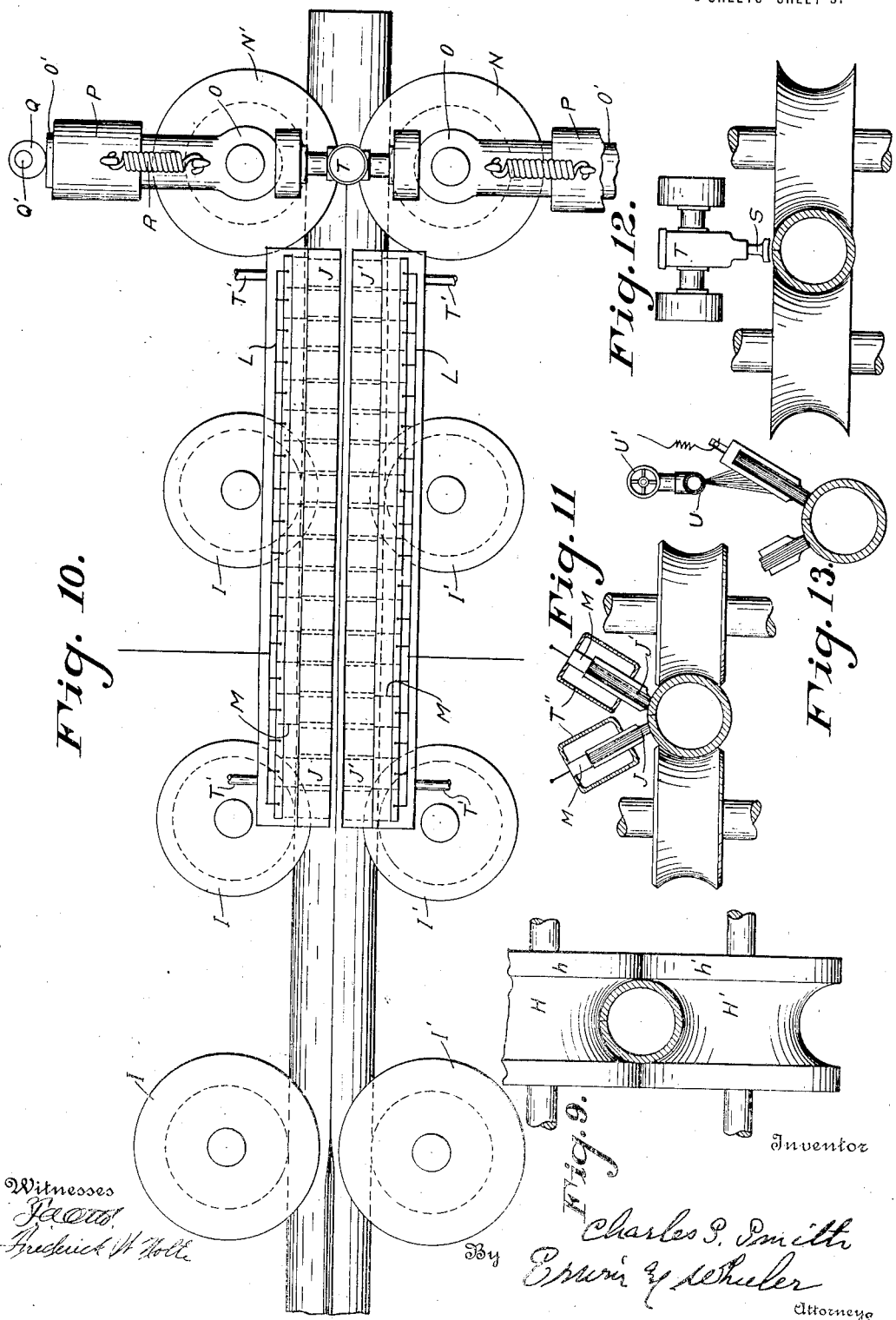

UNITED STATES PATENT OFFICE.

CHARLES S. SMITH, OF MILWAUKEE, WISCONSIN, ASSIGNOR TO A. O. SMITH CORPORATION, OF MILWAUKEE, WISCONSIN, A CORPORATION OF NEW YORK.

TUBE-FORMING APPARATUS.

1,313,025. Specification of Letters Patent. Patented Aug. 12, 1919.

Application filed December 26, 1916. Serial No. 139,043.

*To all whom it may concern:*

Be it known that I, CHARLES S. SMITH, citizen of the United States, residing at Milwaukee, county of Milwaukee, and State of Wisconsin, have invented new and useful Improvements in Tube-Forming Apparatus, of which the following is a specification.

My invention relates to improvements in processes and apparatus for forming steel tubing, with particular reference to the manufacture of seamless steel tubing.

Heretofore attempts have been made to roll sheet metal blanks composed of thin, flexible and easily fused material into the form of a tube, the margins of the blank being subsequently fused and pressed together while in a fused or semi-fused condition, the heat being supplied by passing an electric current through a pencil-shaped terminal to the edges of the blank and along such edges to a negative pole established through a die or through a set of compression rollers, or equivalent devices for forcing the margins of the blank together. In other cases, attempts have been made to fuse tubular blanks by establishing a succession of circuits across the proximate margins of a tubular blank, by employing sets of contact rollers traveling upon and between the proximate margins of the blank, the current passing from one roller to another through the stock and progressively raising the temperature with the object of subsequently bringing the edges of the blank together when a welding temperature is attained.

But so far as I am aware, the apparatus heretofore constructed, (as above referred to), has not been successful, at least for welding steel tubing, since the metal of a steel blank is a very good conductor of heat and the temperature drop is excessive, between successive point contacts obtained by feeding the stock between a lineal series of rollers, each constituting a terminal for an electric circuit. The distances between the points of contact are at least equal to the diameters of the rollers, and when the temperature becomes high, the loss of heat by conduction and radiation is extremely rapid and is great enough to prevent the attainment of a good welding temperature under any ordinary conditions.

The primary object of my invention is to provide efficient means for progressively raising the temperature of the margins of a tubular blank to a point where such margins will readily fuse and weld under pressure, and I propose to attain this general object by bringing the margins into abutting or substantially abutting contact with each other preparatory to the heating operation, and then establishing a series of circuits across the joint or seam formed by said abutting margins, under such conditions as to establish a substantially continuous traverse of electrical energy from one margin of the blank to the other and along a line extending from the point where the heating operation commences to the point where the welding operation is completed or nearly completed. By my invention, the current flow through the stock may be regarded as an electric arc substantially in the form of a continuous sheet looped into the blank for a considerable distance longitudinally thereof and crossing the joint or seam therein.

I also propose to secure more effective contacts at all points within the heating zone than are secured at many by means of rollers, and I accomplish this result by employing friction contact brushes, each composed of a series of contact elements or wires, the lower ends of which bear upon the surface of the blank adjacent to the abutting margins, each of said wires being insulated from the others and connected in parallel with the others to a common feed wire, and the current delivered through these wires passes across the joint formed by the abutting margins to a similarly formed brush of opposite polarity.

A further object of my invention is to provide means whereby the successive brushes may be insulated from each other and destructive temperatures avoided in the brushes; also to provide means for taking up wear due to friction of the brushes upon the traveling blank.

My invention contemplates means for rolling or shaping the blank from a piece or strip of flat sheet metal and feeding it forwardly in the form of a tube between the sets of brushes above described, the tubular blank being progressively compressed during the heating operation and finally subjected to tapping or hammering operations in connection with the pressing operations whereby an effective mingling of the molecules or particles of molten or semi-molten metal may be secured, thereby producing a welded joint of great strength and durability.

In the accompanying drawings—

Figure 1 is a plan view of an initial portion of my apparatus, including the feeding rollers and the initial holding and shaping rollers as they appear in the operation of feeding and shaping a blank.

Figs. 2, 3, 4, and 5 are detail views in elevation of one set of feeding rollers and of the first three sets of holding and shaping rollers.

Fig. 6 is a plan view of a fragment of my apparatus immediately succeeding that illustrated in Fig. 1, showing the final shaping rollers.

Figs. 7, 8 and 9 are detail views, in elevation, of the respective sets of shaping rollers illustrated in Fig. 6.

Fig. 10 is a plan view of the final or rear end portion of my apparatus, showing the compression rollers, the welding brushes and the vibrating or tapping mechanism.

Fig. 11 is a detail view in elevation, showing a set of compression rollers and a set of welding brushes in operative relation to the work.

Fig. 12 is a similar view, showing the vibrating or tapping mechanism.

Fig. 13 is a modified form of construction, whereby excessive temperatures in the brushes are avoided.

Like parts are identified by the same reference characters throughout the several views.

The apparatus preferably employed by me in carrying out my process, and as illustrated in the drawings, includes one or more sets of feeding rollers A,—A', respectively, arranged as best shown in Fig. 2, the lower roller A' being spool shaped and the upper roller A being adapted to fit between the heads a of the spool and adapted to engage a sheet metal strip or blank B between the roller A and the core or body of the spool A'. Where plural sets of feeding rollers are employed, the rollers of each set may be exactly like those of the preceding set. I prefer to employ at least two sets, in order to firmly hold the blank and feed the same forward with a positive, steady motion.

The blank is delivered by the feeding rollers between successive sets of holding rollers C,—C', D,—D', respectively to a set of shaping rollers E,—E'. These shaping rollers E,—E' have a general contour similar to the feeding rollers A,—A', but are shorter and the heads e of the roller E' are provided with concave faces e'. The ends of the roller E are correspondingly curved convexly, and as these curved portions of the rollers E,—E' receive the margins of the blank between them, it is obvious that said margins will be curved upwardly in conformity with the curvature of the faces e'. The curvature of the faces e' conforms to the curvature of the tube to be produced and the portion of the blank, thus upturned at each margin, involves approximately one-quarter of the width of the blank, whereby these curved portions on the two margins may eventually form the upper half of the completed tube.

The form of the work engaging portions of the holding rollers C,—C', D,—D' conforms as nearly as possible to the shape which the blank will naturally assume in the space between the shaping rollers E,—E' and the feeding rollers A,—A' in case ideal conditions exist, with perfect uniformity in the material as to quality, thickness, etc., but, owing to the fact that such perfect uniformity is not found in practice, it is desirable to employ holding rollers in order to prevent distortion. Otherwise one of the margins might turn upwardly to a greater extent than the other margin, or the blank might shift laterally under the stresses developed by the shaping rollers. The rollers C,—C' are employed principally to hold the strip or blank in position of alinement and these rollers are preferably similar in form to the rollers E,—E', but with less curvature at their ends. The rollers D,—D' have increased curvature over the rollers C,—C' and the roller D is preferably provided with end extensions d which are adapted to bear on the up-turned margins of the blank to prevent one margin from rising higher than the other. The peripheral surfaces of these extensions d are preferably conical so as to bear squarely across the edge of the blank and the extremities of the roller D' may be similarly faced or contoured as indicated at d'.

After passing the initial shaping rollers E,—E', the blank is received between an intermediate set of shaping rollers F,—F', whereby the blank is up-turned along its longitudinal central portion and its side margins swung inwardly into close proximity with the sides of the roller F, as clearly shown in Fig. 7. The curvature of the central portion of the roller F' and of the periphery of the roller F is in the arc of a circle of less diameter than that of the tube to be formed, thereby giving to the blank an egg or pear shaped cross-sectional form, the portions between the points 1 and 2 of the blank conforming in curvature with that of the tube to be formed and the portions between the points 2 and 3 being substantially flat or having a slight outward bulge and the central portion between the points marked 3 in Fig. 7 having a greater curvature than that of the completed tube.

After passing the rollers F,—F', the blank is received between the rollers G,—G'. The curvature of the bearing faces of these rollers conforms substantially to that of the completed tube and the pressure of the roller G' upon that portion of the blank between the points 3,—3 indicated in Fig. 7, forces this portion upwardly and reduces the curvature until it conforms to the curvature of the bearing face of the roller, the sides of the blank between the points marked 2 and 3 in Fig. 7 being additionally bulged outwardly into conformity with the bearing faces of the roller G'. The tubular member thus formed is substantially complete, with uniform curvature throughout but with edge margins slightly separated as indicated at 6 in Fig. 8.

The resulting tube delivered by the rollers G,—G' is, of course, slightly larger than the tube when finally completed owing to the fact that the edge margins are slightly separated as indicated at 6 in Fig. 8. The resiliency of the metal tends to close the gap between these margins, owing to the fact that the blank, by the pressure of the rollers F,—F' has had its central portion bent in the arc of a smaller circle than that of the completed tube and subsequently expanded slightly by upward pressure exerted by the roller G'. This tendency of the margins to close together is aided by the rollers H,—H', illustrated in Fig. 9, of which the heads h,—h' are in contact and the intermediate portions are curved exactly in conformity with the tube to be produced.

After passing the rollers H,—H', the margins of the blank are held firmly together by lateral pressure exerted by pulley shaped compression rollers I,—I', arranged in sets on opposite sides of the tube and rotating upon vertical axes, whereas the rollers previously described, rotate upon horizontal axes extending transversely to the axis of the resulting tube. There are a series of sets of the rollers I,—I', each set comprising a pair of these compression rollers and between each pair of compression rollers, I have provided sets of current carrying or electrical brushes J,—J', the ends of which bear upon the tube in frictional contact with its surface, on opposite sides of the abutting margins. Each of these brushes comprises a series of small wires or bars, each adapted to scratch the surface of the advancing tube in more or less independent frictional contact therewith. These bars or wires may be insulated from each other except at their upper ends, where they are connected in common with a feeding conductor L. The brushes of each set or pair are, of course, of opposite polarity, whereby a current of sufficient volume and strength for welding purposes may be passed from one brush into the tube and across the abutting margins thereof to the other brush. By employing a series of pairs of such brushes, it is possible to raise the temperature at the abutting margins of the tube progressively as the tube passes from one set or pair of brushes to the next, and eventually a welding temperature is secured notwithstanding the fact that the tube is in continuous motion.

The object of employing intervening sets of compression rollers between successive sets of brushes, is to not only maintain the pressure upon the tube to hold the abutting margins together, but also to force said margins inwardly as the projecting points or ragged edges become fused. The brushes of each set are separated from those of the next set by a body of insulation M, in order that each set of brushes may operate independently of the others while coöperating with the others to progressively increase the temperature.

After passing the last group of brushes J,—J' the tube is fed between a final set of compression rollers N,—N'. These compression rollers are similar in form to the rollers I, but at least one of them is vibrated along a line transverse to the axis of the tube, thereby exerting a vibratory pressure upon the fused, or partially fused, particles of the tube which has been traversed by the electric current delivered by the brushes of the several groups. A convenient means for imparting such vibratory movement is illustrated in Fig. 10, in which the roller supporting fork O has a shank O' mounted to slide in a fixed bearing P, the shank being actuated by a cam Q carried by a rotary shaft Q'. The cam pushes the shank inwardly carrying with it the roller N', after which the roller is retracted by a tensile spring R.

Simultaneously with the movement of the tube between the rollers N,—N', the welded portion of the tube, across the line of the joint, is preferably subjected to a rapid tapping or hammering operation by means of a tapping plunger S actuated by an electric or pneumatic vibrator T of any ordinary construction. This hammering or tapping operation facilitates the mingling of the fused particles or molecules of the tube, which is delivered from between the rollers N,—N' as a seamless tube, along which, the line of the joint may be traced on the surface but not in the interior of the wall of the tube, when the latter is cut into lengths.

Various changes in form may be made in the tube shaping and engaging rollers and the number of rollers or sets of rollers may be increased or diminished at pleasure to correspond with the requirements of the work, and I therefore do not limit the scope of my invention to the use of rollers of the specific form or number illustrated in the drawings. The character and structure of the electrical brushes is also non-essential, it being merely necessary to deliver electric current in sufficient volume and strength to the moving tube for a sufficient distance in its line of travel to enable the temperature of any given point to be progressively raised until the proper welding temperature is secured.

Each of the rollers above described, including the feeding, holding, shaping, and compressing rollers may be positively driven from any suitable source of power, although it is not essential that all of them should be so driven, particularly where the number of sets of intermediate rollers is multiplied. The rollers which I have designated as holding rollers operate, to some extent, also, as shaping rollers and, if desired, these rollers may be allowed to run idle, since their principal function is to hold the blank from shifting laterally and from turning upwardly on one side to a greater extent than on the other side. The necessity or desirability for positively driving the shaping and compressing rollers will depend largely upon the character of the material from which the tubes are to be formed with reference to flexibility and thickness of the stock, etc.

In order to prevent destructive temperatures in the brushes, I propose to either water-jacket them, as shown at T″ in Fig. 11, or to provide means for spraying water upon them, as shown at U in Fig. 13. Where the water jacket is employed, a circulating current is maintained through the jacket by means of pipes T‴, but where a spray is used, refrigeration takes place principally by evaporation. The delivery of liquid through the spray pipe may be regulated by a valve U′ whereby only a sufficient quantity of water may be delivered to the brushes to compensate for the evaporation, it being necessary to avoid wetting the surface of the blank as would be the case if an excessive quantity of water were delivered.

I claim—

1. Tube forming apparatus, including the combination with a set of bending rolls adapted to progressively shape a longitudinally moving sheet metal blank into tubular form, means for compressing the meeting edges of the tubular portion of the blank into forcible abutting contact with each other, and means for passing electrical currents through said meeting edge portions while the blank is in motion and in the form of a substantially continuous sheet along a considerable portion of its length, said electrical means comprising a set of brushes arranged in close proximity and insulated from each other, whereby the temperature may be progressively and continuously raised as the blank advances.

2. Tube forming apparatus, including the combination with a set of bending rolls adapted to progressively shape a longitudinally moving sheet metal blank into a tubular form, means for compressing the meeting edges of the tubular portion of the blank into forcible abutting contact with each other, and a series of sets of electrical conducting brushes, the brushes of each set insulated and connected in a gang by bonding, and arranged with those of each set on opposite sides of the abutting margins of the tubular portion of the blank in close proximity to each other and in frictional contact with the blank whereby the independent currents are combined as a substantially continuous sheet while independently maintaining their individual strength.

3. Tube forming apparatus including the combination with means for advancing a strip of sheet metal and progressively bending the same into tubular form with its edge margins abutting, of means for delivering a series of electrical welding currents successively across said abutting margins and in such close proximity to each other as to produce a substantially continuous rise in the temperature of the metal throughout the area traversed by said currents, said current delivering means comprising a set of brushes arranged in close proximity and insulated from each other, and connected in a gang by bonding.

4. Tube forming apparatus including the combination with means for advancing a strip of sheet metal and progressively bending the same into tubular form with its edge margins abutting, of a series of sets of friction brushes for delivering electrical welding currents through the metal composing said abutting margins along a line of advancement of the tubular portion of the strip, brushes of each set insulated and connected in a gang by bonding, together with means for progressively compressing said margins upon each other during the welding operation.

5. Tube welding apparatus including the combination with means for advancing a split tube having edge margins substantially abutting, of frictional contact means for delivering a series of proximate electrical welding currents through the metal composing said abutting margins along a line of advancement of the tubular portion of the strip, together with means for progressively compressing said margins upon each other during the welding operation, and means for imparting a succession of impacts to the welding portions of the tube during the final portion of the welding operation.

6. Tube forming apparatus adapted for the construction of seamless tubing from longitudinally moving sheet metal blanks, comprising the combination of a lineal series of sets of feeding rollers, shaping rollers, compressing rollers, and current delivering brushes, said brushes being insulated from each other, and connected in a gang by bonding, and arranged for frictional contact with the tubular portion of the work adjacent to the compressing rollers, the brushes of each set being located on opposite sides of the meeting margins of the strip from which the tube is being formed and adapted to deliver electrical currents across said margins, whereby the successive sets of brushes are adapted to operate in parallel to independently deliver current successively through the same portions of the tube to progressively raise the temperature of the work at said meeting margins.

7. Tube forming apparatus adapted for the construction of seamless tubing from longitudinally moving sheet metal blanks, comprising the combination of a lineal series of sets of feeding rollers, shaping rollers, compressing rollers, and current delivering brushes, said brushes being arranged for frictional contact with the tubular portion of the work adjacent to the compressing rollers, the brushes of each set being located on opposite sides of the meeting margins of the strip from which the tube is being formed and adapted to deliver electrical current across said margins, whereby the successive sets of brushes are adapted to progressively raise the temperature of the work at said meeting margins, together with a set of compressing rollers having relative vibratory motion.

8. Tube forming apparatus adapted for the construction of seamless tubing from longitudinally moving sheet metal blanks, comprising the combination of a lineal series of sets of feeding rollers, shaping rollers, compressing rollers, and current delivering brushes, said brushes being arranged for frictional contact with the tubular portion of the work adjacent to the compressing rollers, the brushes of each set being located on opposite sides of the meeting margins of the strip from which the tube is being formed and adapted to deliver electrical current across said margins, whereby the successive sets of brushes are adapted to progressively raise the temperature of the work at said meeting margins, together with a set of compressing rollers having relative vibratory motion, and a mechanically operated vibratory hammer adapted to strike the advancing tube across the line of said abutting margins beyond said brushes.

9. In a tube forming apparatus, a series of electrical brushes adapted for successive frictional contact with a relatively moving tube along a line extending longitudinally of the tube, said brushes being in close proximity to and insulated from each other and connected in a gang by bonding, whereby the temperature may be continuously raised by delivering successive electrical currents thereto in a sufficiently close order of succession to prevent material temperature drops in the parts of the tube passing from one brush to the next.

10. In a tube forming apparatus, a series of electrical brushes adapted for successive frictional contact with a relatively moving tube along a line extending longitudinally of the tube, said brushes being in close proximity to and insulated from each other and connected in a gang by bonding and being arranged and adapted to deliver independent currents to the tube in the form of a substantially continuous sheet through a multiplicity of closely adjacent contacting elements.

11. In a tube welding apparatus, a lineally alined set of electrical brushes connected with each other in a gang by bonding and insulating material, electrically separating the brushes from each other, all of said brushes being adapted for simultaneous contact with a moving tube, whereby a portion of the tube may be progressively raised to a welding temperature as it passes along the line of brushes.

In testimony whereof I affix my signature in the presence of two witnesses.

CHARLES S. SMITH.

Witnesses:
J. J. STAMM,
CHAS. HANSEN.